Aug. 22, 1967 C. M. RUED 3,337,243
LATERALLY ADJUSTABLE BOAT TRAILER WITH
WHEEL ALIGNMENT MEANS
Filed Jan. 4, 1966 2 Sheets-Sheet 1
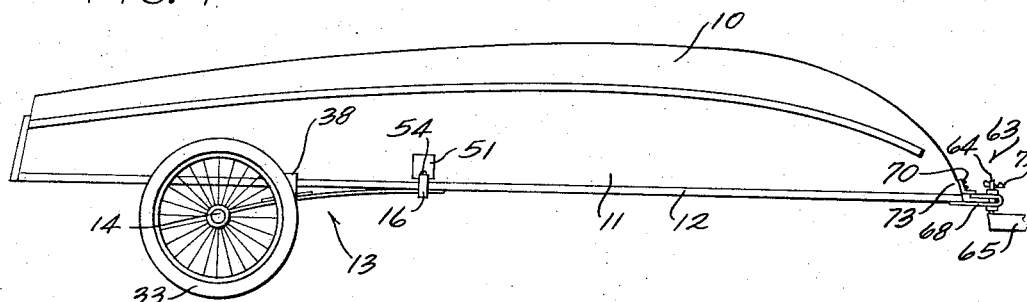
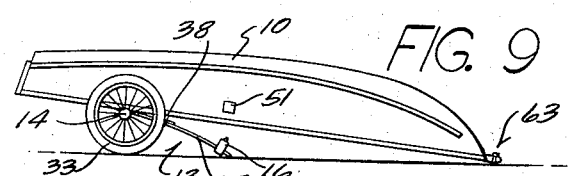
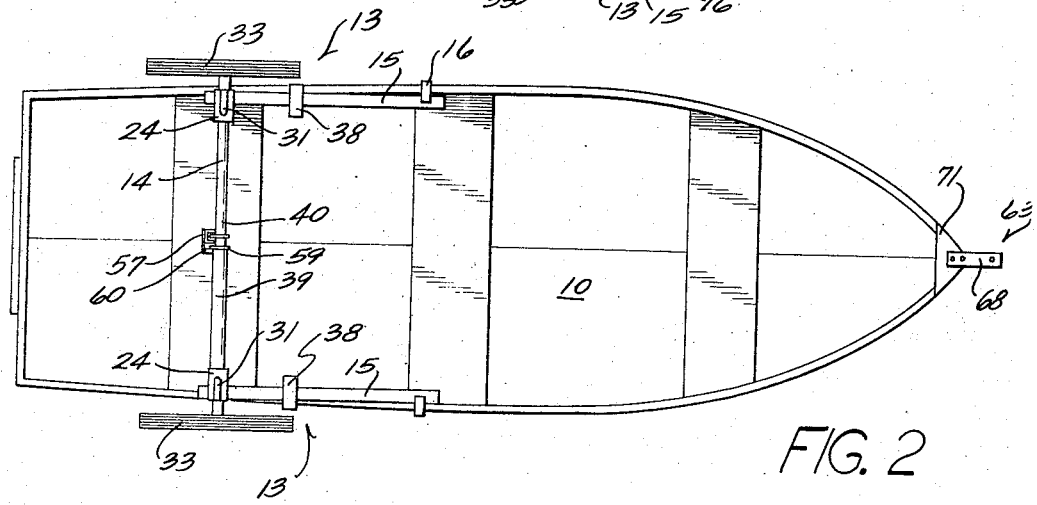
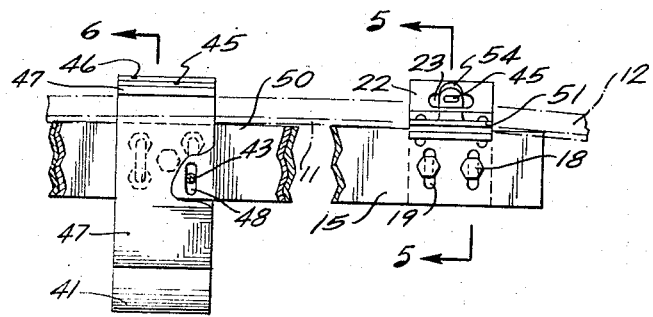
INVENTOR
CARL M. RUED
BY
Wheeler, Wheeler & Wheeler
ATTORNEYS

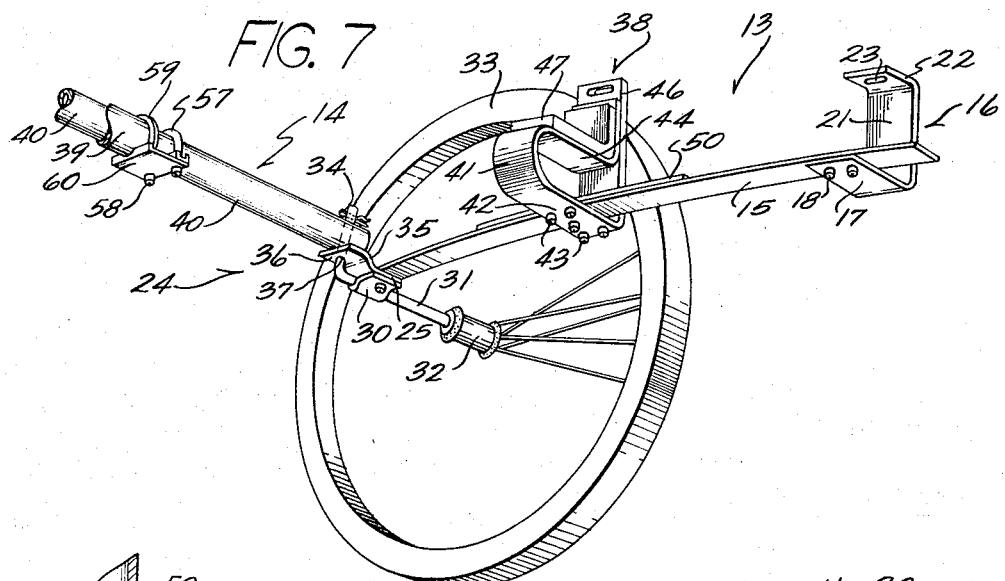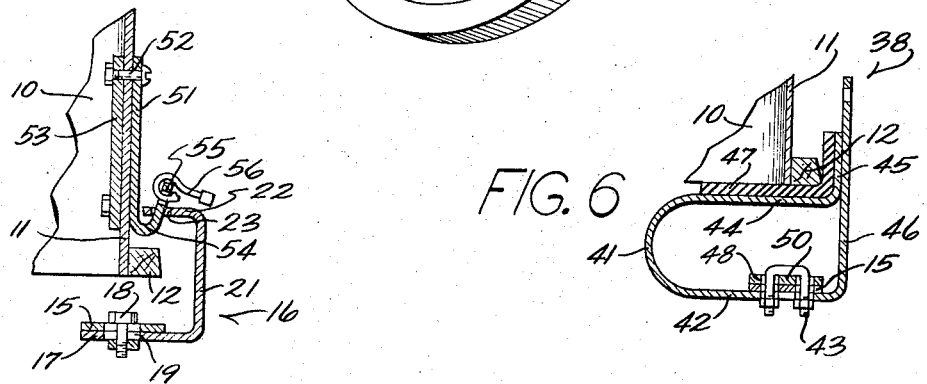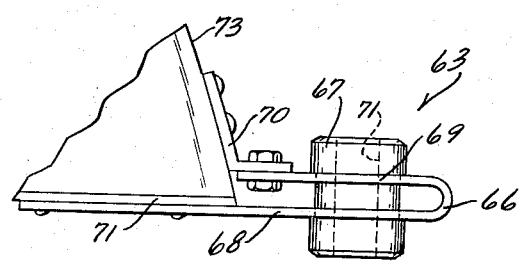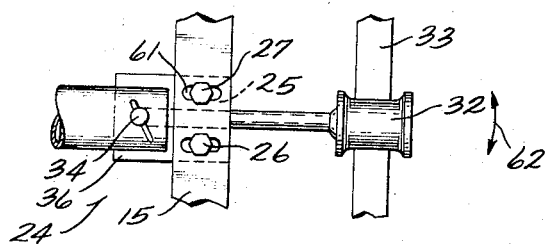

United States Patent Office 3,337,243
Patented Aug. 22, 1967

3,337,243
LATERALLY ADJUSTABLE BOAT TRAILER
WITH WHEEL ALIGNMENT MEANS
Carl M. Rued, 931 4th St. S., Wisconsin Rapids,
Wis. 54494
Filed Jan. 4, 1966, Ser. No. 518,659
11 Claims. (Cl. 280—414)

This invention relates to a lightweight, foldable boat trailer.

The boat trailer of the present invention is designed for towing small boats behind an automobile or other towing vehicle. The boat is inverted to attach and support its gunwales on the draw bars of the trailer wheel sub-assemblies and has a special hitch connected to the towing vehicle. The trailer consists of wheeled sub-assemblies removably attached to the gunwales of the boat. These sub-assemblies provide wheeled supports for the boat as it is towed. They are readily removable from the boat preliminary to placing the boat in the water.

An important feature of the trailer of the present invention is its adjustability to the boat for proper wheel alignment and tracking behind the towing vehicle. The two wheel sub-assemblies are separately attached to the boat and are interconnected by an axle, the length of which is adjustable to fit various sizes of boats and to properly associate the wheels with the towing axis of the boat. Moreover, the stub axles upon which the wheels are mounted are adjustable with respect to the draw bars for proper toe-in of the wheels to produce minimum tire and bearing wear.

Other important features of the invention reside in the pivotal couplings of the sub-assemblies to the cross axle by which the sub-assemblies are free for limited independent movement, both fore and aft and up and down. This freedom of movement of the respective sub-assemblies greatly facilitates and speeds up the assembly and disassembly of the trailer with respect to the boat.

Prior lightweight boat trailers lack these important provisions for assembly, disassembly, wheel alignment, etc. and have not achieved commercial success. By contrast, the trailer of the present invention incorporates full wheel alignment mechanism, and ease of attachment which makes it commercially practical, notwithstanding it is lightweight and foldable.

During periods of non-use, the sub-assemblies are demounted, folded in a compact arrangement, and can be stored in a small space, such as in a car trunk, hung on a garage wall, etc.

Other objects, features, and advantages of the invention will appear from the following disclosure in which:

FIG. 1 is a side elevation of a trailer embodying the present invention, in use.

FIG. 2 is an inverted plan view of the device of FIG. 1.

FIG. 3 is an enlarged fragmentary elevation of the bow hitch.

FIG. 4 is an enlarged fragmentary top view showing parts of one wheel sub-assembly in operative position with respect to the boat gunwale which is shown in broken lines.

FIG. 5 is a fragmentary cross section taken along the line 5—5 of FIG. 4.

FIG. 6 is a fragmentary cross section taken along the line 6—6 of FIG. 4.

FIG. 7 is a fragmentary perspective view from a low vantage point of one of the wheel sub-assemblies and showing its connection to a cross axle.

FIG. 8 is a fragmentary plan view near the rear end of one of the sub-assemblies and showing the interconnection of a wheel stub axle with the rear end of the draw bar, and the adjustable wheel alignment connection therebetween.

FIG. 9 is a side view showing a wheel sub-assembly partially attached to the boat.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

A lightweight boat 10 is illustrated as a typical load for the trailer of the present invention. It has gunwales typically consisting of the boat side wall 11 and a reinforcing bead or strip 12. The trailer will also fit other boats having other gunwale configurations.

The trailer consists of two wheeled sub-assemblies 13, one at each side of the boat. These are interconnected by an adjustable length, telescopic tubular axle 14. Each sub-assembly 13 consists of a draw bar 15 which desirably comprises a flat strip of spring steel. At its front end, each draw bar 15 is provided with a C-shaped or channel-shaped draw bracket 16. Bracket 16 has a bottom flange 17 attached to the draw bar 15 by bolts 18 or the like, an upright web 21 and a top flange 22 with a central hook receiving opening 23. Bolts pass through laterally extending slots 19 in the flange 17 and draw bar 15, thus to afford adjustment of these parts to fit various sizes and shapes of boat gunwales.

At its rear end, the draw bar 15 is provided with a wheel coupling 24 which consists of a coupling pad 25 to which the draw bar 15 is connected by bolts 26, 27. Beneath the pad 25 there is a curved strap 30, also secured by bolts 26, 27, which holds the stub axle 31 for the bearing hub 32 of a bicycle type wheel 33. The end of the axle 31 is turned upwardly to provide a spindle 34 to which axle 14 is pivotally connected.

Coupling 24 further comprises an elevated bracket 36 which is parallel to pad 25 and is connected in upwardly spaced relation thereto on a curved web 35. Bracket 36 has a hole 37 through which the spindle 34 projects, thus to brace the spindle 34 rigidly in upright position.

Intermediate its length, the draw bar 15 has a boat gunwale support cradle 38. Cradle 38 comprises a bent metal strap bracket having a bowed portion 41 with a bottom leg 42 connected by bolts 43 to the draw bar 15 and an overlying reinforcing spring strap 50. The bolts 43 fit through laterally elongated slots 48 in the bar 15 and strap 50, thus to afford lateral adjustability of the cradle on the draw bar.

Bow 41 has an upper leg 44, the end of which is bent upwardly to form a flange 45 which is welded or otherwise fastened to another upright flange 46 extending from lower leg 42. Flanges 45, 46 embrace the boat gunwale 11, 12, as illustrated in FIG. 6. A cushion 47 of rubber or the like is adhesively or otherwise fastened to the cradle leg 44 and flange 45 to cushion the boat gunwale, prevent marring thereof, and provide an expansion joint between the boat and the trailer.

The respective sub-assemblies 13 are removably secured to the boat gunwales on the draw anchor brackets 51 which are attached to the side of the boat by bolts 52 which extend through the boat sides 11 and desirably also through a backup plate 53. The plates 51 are provided with reversely curved hooks 54 which have keyholes 55 therein.

In attaching the sub-assemblies to the boat, the gunwale draw anchor bracket 16 on each sub-assembly is manipulated to its position shown in FIG. 5, thus to pass the hook 54 of plate 51 through the opening 23 in the top flange 22 of the brackets 16. A key such as snap hook 56 may then be passed through the keyhole 55 in the hook 54 to secure the parts together. The weight of the boat is supported upon the cradle 38, as shown in FIG. 6.

The two sub-assemblies are then adjusted for a snug embrace of the cradles 38 with the boat gunwales by adjusting the telescopic tubular axle 14. The axle is made of telescopically related parts provided with a clamp bracket 57 by which its overall length is readily adjusted. Clamp bracket 57 is released and the wheel sub-assemblies 13 are moved toward each other just enough to snugly engage the cradles with the boat gunwales, as illustrated in FIG. 6, whereupon the clamp bracket 57 on the tubular axle 14 is tightened by applying pressure to its nuts 58, thus to hold the parts firmly together.

The foregoing is a very important feature of the invention because it permits ready adjustment of the trailer to boats of various widths and lengths. Regardless of the specific dimension of the boat, the wheel sub-assemblies can be quickly mounted thereon, and, by adjustment of the over-all length of the axle 14, the cradles will snugly embrace the boat gunwales.

It is also very important to be able to adjust the alignment of wheels 33 for proper tracking behind the towing vehicle and for minimum bearing and tire wear. For this purpose the draw bars 15 have an adjustable connection with the bracket pads 25 of the wheel couplings 24. Note in FIG. 8 that there is a transverse slot 61 formed in the pad 25. When the bolts 26, 27 are loosened, the stub axle 31 can be oscillated in the direction of the arrows 62 about the axis of bolt 26. The pivotal movement of axle 14 on spindle 34 permits this adjustment. When the wheels are properly aligned with an appropriate amount of toe-in (approximately 1/16 inch at front of tires), the bolts 26, 27 are tightened and the wheels 33 are now properly aligned.

An important feature of the invention resides in the construction of the adjustable span axle 14 by which its two telescopically related sections are permitted to freely turn, one within the other. The hollow outer section 39 is provided with an end collar 59. Inner section 40 may turn freely within outer section 39, and its clamp bracket 57 is provided with a flange 60 which overhangs the collar 59 to hold the sections together at an adjustably fixed over-all length or span, while permitting the inner sections to rotate within the outer section. Accordingly, one sub-assembly 13 is free to rotate about the axis of axle 14 independently of the other sub-assembly.

The importance of this structure is illustrated in FIG. 9 which shows a wheel sub-assembly in an initial stage of its assembly to the boat 10. The boat gunwale is first supported directly on the trailer axle 14. The boat prow rests on the ground and the forward ends of the draw bars 15 also rest on the ground. Each draw bar is now in turn rotated about the axis of axle 14 and its draw coupling 16 attached to draw plate bracket 51 on the boat (FIG. 1). In the course of this movement, the cradle 38 comes into support relation to the gunwale and lifts one side of the boat off of the axle 14. Only one of the two sections 39, 40 of the axle 14 turns during this movement of each sub-assembly. Accordingly, it is important that the opposite ends of the axle 14 be independently rotatable.

The pivotal connections between the spindles 34 and the ends of axle 14 are also important. This permits independent fore and aft movement of the sub-assemblies 13 in the course of registering openings 23 in bracket 16 with the hooks 54 on brackets 51. The features aforesaid greatly speed up and simplify assembly and disassembly of the trailer respecting the boat.

The front of the boat is provided with a hitch 63 which is adapted to couple with a draw pin 64 on the towing bracket 65 of the towing vehicle. Hitch 63 consists of a yoke 66 having spaced legs 68, 69 and a heavy rubber or similar elastic grommet 67 spanning thereacross. There is a vertical bore 71 through which grommet 67 and into which the draw pin 64 fits, as shown in FIG. 1. A removable cotter key 72 will hold the draw pin 64 from withdrawal from the grommet 67. This provides a very simple, but effective, draw coupling between the towing vehicle and the boat 10. The elastic quality of the grommet 67 introduces some resiliency into the tow coupling.

Top leg 68 of hitch 63 overlies the bow plate 71 of the boat and is fastened thereto by bolts or the like. Bottom leg 69 is provided with an oblique extension strap 70 bolted or otherwise fastened to the boat prow 73.

The total weight of a practical embodiment of the invention is 45 pounds. Notwithstanding its light weight, this embodiment can carry boats weighing up to 250 pounds. The trailer may be removed from the boat and disassembled within three minutes. Conversely, it may be assembled and attached to the boat within three minutes.

I claim:

1. In a lightweight foldable boat trailer adapted to be releasably attached to the gunwales of a boat, the combination of:

first and second sub-assemblies each comprising a wheel, a draw bar extending along the boat gunwale, a wheel coupling attaching the wheel to the rear end of the draw bar, a gunwale draw anchor at the forward end of the draw bar and a gunwale support cradle intermediate the ends of the draw bar, an adjustable span cross axle, and couplings between the rear ends of the draw bars and the ends of the cross axle.

2. The boat trailer of claim 1 in which said wheel couplings are adjustably attached to the draw bars to facilitate wheel alignment adjustment.

3. The boat trailer of claim 1 in which each said wheel coupling comprises a stub axle on which the wheel is journaled, said couplings comprising upright spindles on the stub axles to which said cross axle is pivotally coupled.

4. The boat trailer of claim 3 in which each said wheel coupling further comprises a pad to which the stub axle is connected, said draw bar overlying said pad and swingably connected thereto.

5. The boat trailer of claim 1 in which the front of the boat is provided with a hitch adapted to be connected to an upright draw pin on a drawing vehicle, said hitch comprising a yoke having spaced apart legs and a grommet of resilient material spanning across said legs and having a central bore in which the draw pin is received.

6. The boat trailer of claim 1 in which the boat has a gunwale bracket with a hook projecting away from the draw bar, said gunwale draw anchor at the forward end of the draw bar comprising a bracket having a flange with an opening through which said hook is received.

7. A trailer hitch comprising one part which consists of an upright draw pin and another part which comprises a yoke having spaced apart legs and a grommet of resilient material spanning across said legs and having a central bore in which the draw pin is received.

8. The hitch of claim 7 in which one of said legs has a longitudinal extension adapted to be attached to the bow plate of a boat, the other leg having an oblique extension adapted to be attached to the prow of the boat.

9. The trailer of claim 1 in which the ends of said cross axle are free to turn with respect to each other, for independent turning movement of one sub-assembly with respect to the other sub-assembly and with respect to the boat.

10. The trailer of claim 9 in which the said cross axle comprises telescopically related sections, one turnable within the other, and a rotatable clamp by which the span of the axle is adjustably fixed without preventing relative rotation of said sections.

11. The trailer of claim 1 in which said couplings comprise pivotal connections on upright axes between the ends of the draw bars and the ends of the cross axle, whereby the respective sub-assemblies are free for independent fore and aft adjustment with respect to the boat.

References Cited

UNITED STATES PATENTS

| | | | |
|---|---|---|---|
| 2,216,553 | 10/1940 | Greene | 280—515 X |
| 2,540,279 | 2/1951 | Mosier | 280—414 |
| 2,844,383 | 7/1958 | Deeter | 280—124 |
| 2,909,378 | 10/1959 | Bocher | 280—414 X |
| 3,101,203 | 8/1963 | Raymond | 280—35 |
| 3,159,410 | 12/1964 | Raymond | 280—414 X |

LEO FRIAGLIA, *Primary Examiner.*